United States Patent [19]

Biegen

[11] Patent Number: 4,820,049

[45] Date of Patent: Apr. 11, 1989

[54] COATING AND METHOD FOR TESTING PLANO AND SPHERICAL WAVEFRONT PRODUCING OPTICAL SURFACES AND SYSTEMS HAVING A BROAD RANGE OF REFLECTIVITIES

[75] Inventor: James F. Biegen, Middletown, Conn.

[73] Assignee: Zygo Corporation, Middlefield, Conn.

[21] Appl. No.: 109,715

[22] Filed: Oct. 16, 1987

[51] Int. Cl.[4] .............................................. G01B 11/00
[52] U.S. Cl. .................................................... 356/360
[58] Field of Search ............................... 356/359, 360

[56] References Cited

U.S. PATENT DOCUMENTS

| | | | |
|---|---|---|---|
| 3,998,553 | 12/1976 | Hunter et al. | 356/359 |
| 4,201,473 | 5/1980 | Domenicati et al. | 356/360 |
| 4,696,572 | 9/1987 | Ono | 356/360 X |

*Primary Examiner*—Davis L. Willis
*Assistant Examiner*—Matthew W. Koren
*Attorney, Agent, or Firm*—Bryan, Cave, McPheeters & McRoberts

[57] ABSTRACT

An improved system for testing a full reflectivity range of optical surfaces employs an improved Fizeau spherical or plano wavefront interferometer comprising a laser source (2) and an optical element (18) located in the wavefront (16) having a reference surface (20) everywhere normal to the wavefront (16) which has a partially reflective, partially absorbtive, and partially transmissive beamsplitting coating (19) applied to the plano or spherical reference surface (20) and having a transmittance such that there will be only two beam interference and the contrast of the two beam interference fringes between the reflected reference wavefront (25R) and the reflected test wavefront (25T) will be substantially equalized at the two extremes of the test surface (28) reflectivity.

20 Claims, 2 Drawing Sheets

COATING AND METHOD FOR TESTING PLANO AND SPHERICAL WAVEFRONT PRODUCING OPTICAL SURFACES AND SYSTEMS HAVING A BROAD RANGE OF REFLECTIVITIES

BACKGROUND OF THE INVENTION

1. Field of the Invention

The present invention relates to a coating and method useful for the interferometric measurement of plano and spherical wavefront producing optical surfaces and systems. More particularly, the invention relates to the application of a partially absorbtive metallic or semi-metallic optical coating which is applied to the reference surface of a spherical or plano wavefront Fizeau interferometer to produce high contrast two-beam interference fringes for any test surface or system reflectivity.

2. The Prior Art

The development of the laser and advances in vacuum coating technology have greatly expanded the utility of classical interferometers. The Fizeau interferometer, in particular, has become an extremely convenient and flexible instrument for a wide variety of optical metrology applications. Nevertheless, a conspicuous shortcoming of the laser Fizeau interferometer has been in testing high reflectivity optical surfaces and systems which produce plano and spherical wavefronts. With the recent developments in phase measurement interferometry where high contrast, two-beam interference fringes are required to simplify the data analysis, this is especially germane, see M. Schaham, *Proceedings SPIE*, Vol. 306, pp. 183-191 (1981). A multiple-beam spherical wavefront Fizeau interferometer is discussed in detail by Heintze et al. in *Applied Optics*, Vol. 6, p. 1924 (November, 1967). The major difficulties with the interferometer discussed by Heintze et al. are: (1) the partially transmissive coating on the spherical reference surface must be selected to match closely the reflectivity of the test surface or system to achieve useful contrast. Therefore, a number of these expensive surfaces is required to handle a range of test surface or system reflectivity, and (2) a field lens which matches each test surface or system is required, and (3) multiple-beam interference fringes are produced, thereby excluding fringe analysis using phase measurement interferometry. A multiple-beam plano wavefront Fizeau interferometer has similar difficulties as mentioned for the multiple-beam spherical wavefront Fizeau interferometer with the exception that a field lens is not required. Another method is to use the Fizeau interferometer together with a thin coated pellicle placed into the interferometer cavity, i.e., the space between the reference surface and the test surface or system, having a transmission determined by the test surface or system reflectivity, see Hunter and Forman, U.S. Pat. No. 3,998,553 issued Dec. 21, 1976. The difficulties with this method are: (1) locating the pellicle in the interferometer cavity limits the proximity to which a test surface or system can be positioned relative to the reference surface. This severely limits the range of test surface or system surface curvatures that can be tested, and (2) the pellicle itself is expensive, delicate, and easily damaged, and (3) the introduction of the pellicle into the interferometer cavity in the presence of a strongly convergent or divergent measurement beam has the effect of introducing significant wavefront errors which seriously degrade the measurement accuracy of the interferometer, and (4) usually more than one pellicle is required for the full range of test surface or system reflectivity, and (5) the back reflections from the pellicle surface can produce spurious fringes or cause severe reductions in fringe contrast requiring the pellicle to be tilted with respect to the interferometer optical axis limiting still further the volume between the reference surface and the test surface or system.

Other types of interferometry are used to test high reflectivity optical surfaces and systems. For example, scatter plate interferometers and shearing-type interferometers are two prominent prior-art techniques. However, these interferometers are not only difficult to use and align, but they are also considerably less versatile than the Fizeau interferometer. The Twyman-Green two-beam interferometer, while being able to measure the full range of optical surface and system reflectivity without any additional surfaces in the interferometer cavity or any specialized coating on the reference surface, other than one to match the test surface or system reflectivity, has the disadvantage of being more complex and expensive. That is, following the beamsplitting surface, any optical surface or element in either arm of the interferometer up to and including the reference surface must be of high optical quality, whereas in the Fizeau interferometer, only the reference surface must be of high optical quality. Also, the interferometer cavity in a Twyman-Green interferometer is inherently longer than a Fizeau interferometer cavity and thus more susceptible to environmental noise.

While these prior-art techniques are useful for some applications, they cannot be used in those optical metrology applications requiring both phase measurement interferometry and a small separation between the reference surface and test surface or system. To this end, a coating and method are required for testing the full reflectivity range of expected optical surfaces and systems without the limitations of the above-mentioned prior-art.

SUMMARY OF THE INVENTION

In accordance with the instant invention, I test a full reflectivity range, i.e., from 4% to 100%, of optical surfaces and systems by modifying a standard Fizeau spherical or plano wavefront interferometer consisting of (1) a source of light, most preferably a laser (2) means for passing said light, as an expanded beam, through (3) an optical element located in the wavefront whose last surface, the reference surface, is everywhere normal to the wavefront which has (4) a partially reflective, partially absorbtive, and partially transmissive beamsplitting coating applied to the plano or spherical reference surface to produce a reflected reference wavefront and a transmitted converging, diverging or plano test wavefront, which is directed at (4) a common center of curvature of the reference surface and the plano or spherical test surface or system (5) said test wavefront then interacts with the test surface or system and is returned from the test surface or system by reflection back through the reference surface and (6) means for interfering the reflected reference wavefront and reflected test wavefront; the invention consists of the application of a partially reflective and partially absorbtive optical coating onto the reference surface which has a transmittance T determined by $$T = \{R_r / [R_{t(max)} R_{t(min)}]^{\frac{1}{2}}\}^{\frac{1}{2}}$$

where $R_r$ is the reference surface reflectivity and $R_{t(max)}$ and $R_{t(min)}$ are respectively, the maximum and minimum expected test surface or system reflectivity. If the reference surface coating is chosen such that the above relationship is adhered to, then there will be only two beam interference and the contrast of the two-beam fringes will be equalized at the two extremes of the test surface or system reflectivity $R_{t(max)}$ and $R_{t(min)}$.

THE DRAWINGS

DETAILED DESCRIPTION OF THE INVENTION

Figure 1:
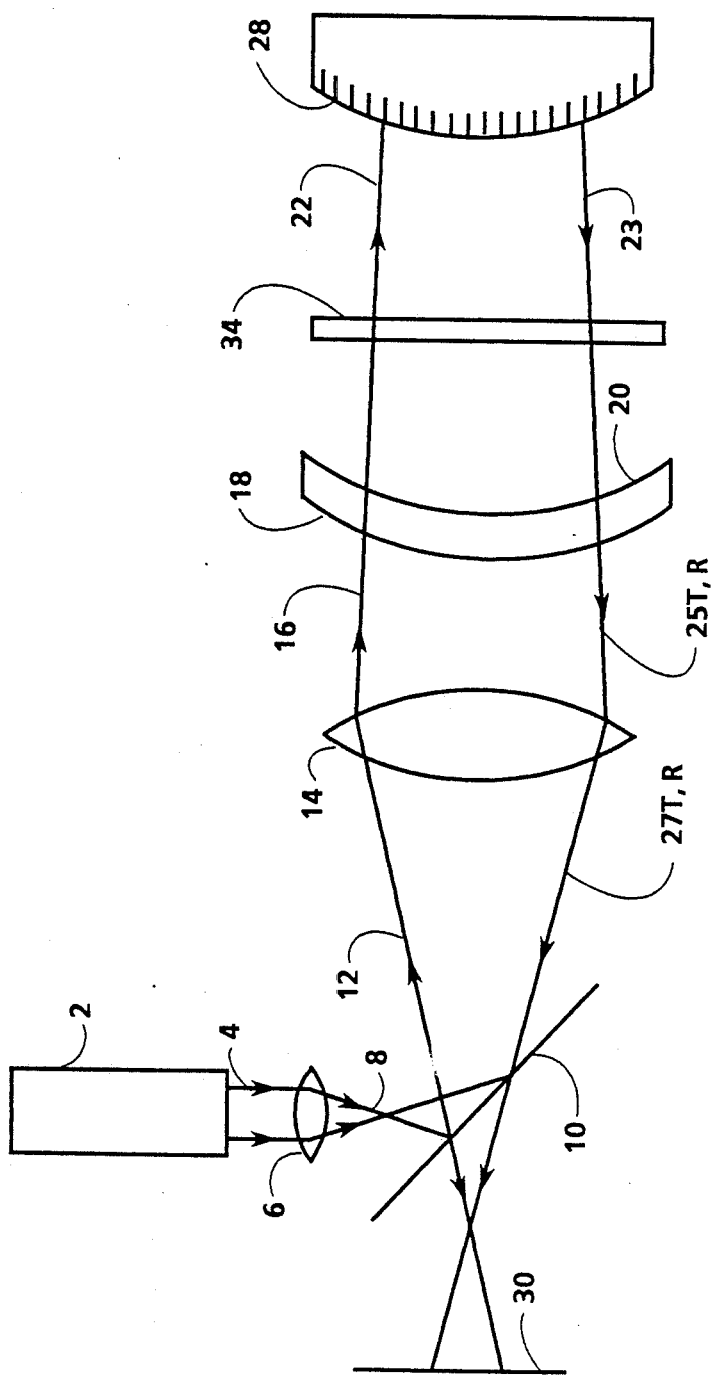
FIG. 1 is a schematic of a spherical wavefront Fizeau interferometer with the addition of a pellicle into the interferometer cavity—i.e., the prior art.

FIG. 1 shows the layout of a typical Fizeau two-beam spherical wavefront interferometer. A light source, most preferably a laser (2) provides radiation. The output laser beam (4) is focused by lens (6) to produce the converging spherical wavefront (8) which after passing through focus emerges as diverging spherical wavefront (8) and is then reflected by beamsplitter (10). The beam reflected from the beamsplitter (10), the diverging spherical wavefront (12), is converted to a converging spherical wavefront (16) by lens (14). Lenses (6) and (14) serve to expand the diameter of the output laser beam (4). Element (18) is an aplanatic element located in wavefront (16). Element (18) has a non-refracting, spherical reference surface (20). Reference surface (20) has a fixed reflectivity of about 4% and a transmission of about 96% assuming an element (18) substrate of glass or fused silica. The wavefront produced by the reflection of wavefront (16) from reference surface (20) is the reference wavefront (25R), the wavefront transmitted by surface (20), is the converging spherical test wavefront (22). The test wavefront (22) is transmitted through a thin, partially transmissive plastic pellicle (34) coated with a partially transmissive coating where it reflects from the high reflectivity test surface (28) to become diverging wavefront (23). Diverging wavefront (23) is transmitted through the thin, partially transmissive plastic pellicle (34) and the reference surface (20) to become the test wavefront (25T). The diverging test wavefront (25T) and reference wavefront (25R) are transformed into converging spherical wavefronts (27R) and (27T) by lens (14) where the interference of the wavefronts (27R) and (27T) is viewed at interference plane (30).

Figure 2:
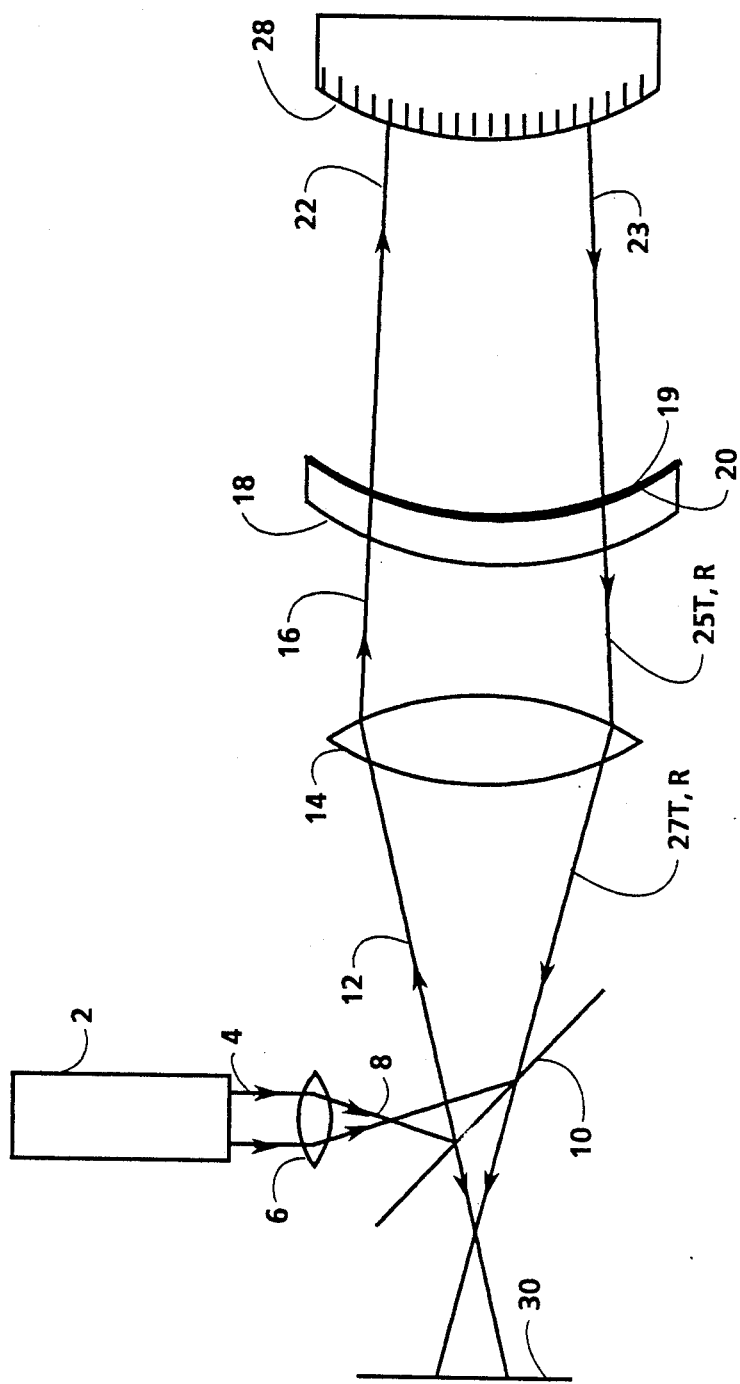
FIG. 2 is a schematic of a spherical wavefront Fizeau interferometer with the absorbtive beamsplitting coating of the instant invention on the reference surface.

FIG. 2 is a schematic of a spherical wavefront Fizeau interferometer useful for testing the full reflectivity range of optical surfaces and systems which is the preferred embodiment of the invention.

Referring to FIG. 2, the significant differences from the interferometer of FIG. 1 are (a) the application of a partially reflective, partially absorbtive, and partially transmissive reference surface beamsplitting coating (19) in lieu of the thin, partially transmissive plastic pellicle (34), and (b) the reference surface beamsplitting coating (19) has a fixed reflectivity $R_r$ and transmittance T determined by the relation $$T = \{R_r / [R_{t(max)} R_{t(min)}]^{\frac{1}{2}}\}^{\frac{1}{2}}$$

where $R_{t(max)}$ and $R_{t(min)}$ are respectively, the maximum and minimum expected test surface or system reflectivity, and (c) the reference surface beamsplitting coating (19) suppresses any reflection off the reference surface (20) from the incident diverging wavefront (23) causing essentially two-beam interference to occur. If the reference surface beamsplitting coating (19) is chosen such that the above relationship is adhered to, then the contrast of the two-beam fringes will be equalized at the two extremes of test surface or system reflectivity $R_{t(max)}$ and $R_{t(min)}$. The fringe contrast C can be defined in terms of test surface or system and reference surface reflectivity as follows:

$$C = 2T(R_r R_t)^{\frac{1}{2}} / (R_r + T^2 R_t)$$

where $R_t$ is the test surface or system reflectivity. In fact, the fringe contrast C will typically be about 75% at the two extremes of test surface or system reflectivity for two-beam interference fringes when the reference surface reflectivity $R_r$ is about 10% and the test surface or system reflectivity $R_t$ is either 4% or 100% for a transmittance T of about 70%. The fringe contrast C increases for any test surface or system reflectivity between the two extremes of 4% and 100% and reaches 100% for test surface or system reflectivity approaching 20%. Because maximum fringe contrast is not critical during an interferometric measurement and a fringe contrast of 70% is more than adequate for most measurement accuracy needs, a reference surface coating with a given transmittance T can suffice for a very broad range of test surface or system reflectivity. Better fringe contrast at the test surface or system reflectivity extremes is obtained by sub-dividing the test surface or system reflectivity range so that more than one coated reference surface, each with a different transmittance T, is optimized for this smaller test surface or system reflectivity range. Any number of test surface or system reflectivity increments can be chosen and coatings designed which would maximize fringe contrast across any test surface or system reflectivity range.

The advantages of the instant invention arise from the application of a test and reference wavefront splitting absorbtive coating to the reference surface to maximize fringe contrast over any test surface or system reflectivity range. This coating suppresses multiple-beam interference by eliminating the reflection off the reference surface of the beam returning from the test surface or system to produce essentially two-beam interference fringes necessary for accurate automatic phase measurement interferometry. The instant invention does this without an additional absorbtive or reflective element in the interferometer cavity. The increased reflectivity of the reference surface, typically 10%, results in (1) a more light efficient interferometer when compared to one having a reference surface whose substrate is uncoated glass and (2) the intercavity medium need not be air, but can be oil, water, etc., which provides the ability to make very high resolution, high accuracy interferometric measurements.

The specific embodiments of the invention disclosed herein can, of course, be changed without departing from the invention, which is defined in the claims.

What is claimed is:

1. In a test system comprising a Fizeau spherical or plano wavefront interferometer, said interferometer comprising a source of light for providing a wavefront, a plano or spherical test surface, an optical element located in said wavefront and having a reference surface normal to said wavefront, said reference surface comprising a last surface with respect to the direction of said wavefront, said reference surface producing a reflected reference wavefront and a transmitted test wavefront which is directed at a common center of curvature of said reference surface and said plano or spherical test surface, said test wavefront interacting with said test surface and being returned from said test surface by reflection back through said reference surface, and means for interfering said reflected wavefront and reflected test wavefront for producing two beam interference fringes; the improvement comprising a partially reflective, partially absorbtive, partially transmissive beam splitting coating on said reference surface, said coating having a fixed reflectivity and transmittance such that there will be only two beam interference and the contrast of said two beam interference fringes is substantially equalized with respect to said test surface reflectivity.

2. An improved system in accordance with claim 1 wherein said coating is such that said contrast is substantially equalized at the two extremes of said test surface reflectivity.

3. An improved system in accordance with claim 2 wherein said source of light is a laser.

4. An improved system in accordance with claim 3 wherein said system comprises means for testing a full reflectivity range of said plano or spherical test surface.

5. An improved system in accordance with claim 4 wherein said full reflectivity range comprises from 4% to 100%.

6. An improved system in accordance with claim 3 wherein said means for passing said light through said optical element comprises means for passing said light through said optical element as an expanded beam.

7. An improved system in accordance with claim 6 wherein said transmitted test wavefront comprises a transmitted converging, diverging or plano test wavefront.

8. An improved system in accordance with claim 7 wherein said reference surface is everywhere normal to said wavefront.

9. An improved system in accordance with claim 8 wherein said coating has a transmittance T determined by $$T = \{R_r / [R_{t(max)} R_{t(min)}]^{\frac{1}{2}}\}^{\frac{1}{2}}$$

where $R_r$ is said reference surface reflectivity and $R_{t(max)}$ and $R_{t(min)}$ are respectively, the maximum and minimum expected test surface reflectivity.

10. An improved system in accordance with claim 3 wherein said coating has a transmittance T determined by $$T = \{R_r / [R_{t(max)} R_{t(min)}]^{\frac{1}{2}}\}^{\frac{1}{2}}$$

where $R_r$ is said reference surface reflectivity and $R_{t(max)}$ and $R_{t(min)}$ are respectively, the maximum and minimum expected test surface reflectivity.

11. An improved system in accordance with claim 1 wherein said source of light is a laser.

12. An improved system in accordance with claim 11 wherein said coating has a transmittance T determined by $$T = \{R_r / [R_{t(max)} R_{t(min)}]^{\frac{1}{2}}\}^{\frac{1}{2}}$$

where $R_r$ is said reference surface reflectivity and $R_{t(max)}$ and $R_{t(min)}$ are respectively, the maximum and minimum expected test surface reflectivity.

13. An improved system in accordance with claim 1 wherein said coating has a transmittance T determined by $$T = \{R_r / [R_{t(max)} R_{t(min)}]^{\frac{1}{2}}\}^{\frac{1}{2}}$$

where $R_r$ is said reference surface reflectivity and $R_{t(max)}$ and $R_{t(min)}$ are respectively, the maximum and minimum expected test surface reflectivity.

14. An improved system in accordance with claim 10 wherein said means for passing said light through said optical element comprises means for passing said light through said optical element as an expanded beam.

15. An improved system in accordance with claim 13 wherein said reference surface is everywhere normal to said wavefront.

16. An improved system in accordance with claim 1 wherein said reference surface is everywhere normal to said wavefront.

17. An improved system in accordance with claim 16 wherein said source of light is a laser.

18. An improved system in accordance with claim 1 wherein said coating is a metallic or semi-metallic optical coating.

19. An improved system in accordance with claim 18 wherein said source of light is a laser.

20. An improved system in accordance with claim 13 wherein said contrast is represented by C and is defined in terms of said test surface and said reference surface reflectivity by the expression $$C = 2T(R_r R_t)^{\frac{1}{2}} / (R_r + T^2 R_t)$$

where $R_t$ is said test surface reflectivity.

* * * * *